United States Patent [19]

Nomura

[11] Patent Number: 5,469,300
[45] Date of Patent: Nov. 21, 1995

[54] ZOOM LENS BARREL

[75] Inventor: Hiroshi Nomura, Tokyo, Japan

[73] Assignee: Asahi Kogaku Kogyo Kabushiki Kaisha, Tokyo, Japan

[21] Appl. No.: 337,235

[22] Filed: Nov. 4, 1994

Related U.S. Application Data

[63] Continuation of Ser. No. 74,723, Jun. 10, 1993, abandoned, which is a continuation of Ser. No. 602,176, Oct. 23, 1990, abandoned.

[30] Foreign Application Priority Data

| Oct. 27, 1989 | [JP] | Japan | 1-281116 |
| May 23, 1990 | [JP] | Japan | 2-133124 |
| Jun. 1, 1990 | [JP] | Japan | 2-58107 U |
| Jul. 26, 1990 | [JP] | Japan | 2-79613 U |
| Jul. 26, 1990 | [JP] | Japan | 2-79614 U |
| Jul. 26, 1990 | [JP] | Japan | 2-79615 U |
| Aug. 8, 1990 | [JP] | Japan | 2-84337 U |
| Aug. 8, 1990 | [JP] | Japan | 2-84338 U |

[51] Int. Cl.$^6$ .................................................. G02B 15/14
[52] U.S. Cl. ............................ 359/700; 359/704; 359/706
[58] Field of Search .............................. 350/247, 252, 350/255, 257, 429, 430; 354/286, 488, 195.1, 195.12, 400–408; 359/694–706, 811–830

[56] References Cited

U.S. PATENT DOCUMENTS

| 4,199,227 | 4/1980 | Uesugi et al. | 359/706 |
| 4,275,952 | 6/1981 | Usesugi | 359/701 |
| 4,315,670 | 2/1982 | Shigoky | 359/700 |
| 4,322,150 | 3/1982 | Kamata et al. | 350/255 |
| 4,445,756 | 5/1984 | Komoto | 359/700 |
| 4,534,625 | 8/1985 | Ohnuki | 350/429 |
| 4,560,237 | 12/1985 | Ohkura et al. | 350/252 |
| 4,564,264 | 1/1986 | Komoto | 350/252 |
| 4,582,350 | 4/1986 | Okajima | 350/429 |
| 4,759,618 | 7/1988 | Kamata | 359/694 |
| 4,779,964 | 10/1988 | Ozawa et al. | 359/700 |
| 4,910,544 | 3/1990 | Nomura | 359/701 |
| 4,948,227 | 8/1990 | Takeyasu | 359/827 |
| 4,993,815 | 2/1991 | Yamazaki et al. | 354/195.12 |
| 5,017,850 | 5/1991 | Harada et al. | 318/599 |
| 5,034,762 | 7/1991 | Kohmoto | 354/195.12 |
| 5,035,493 | 7/1991 | Tanaka | 354/195.12 |
| 5,043,752 | 8/1991 | Kohmoto | 354/195.12 |
| 5,079,577 | 1/1992 | Nomura | 354/233 |
| 5,144,493 | 9/1992 | Nomura | 359/700 |
| 5,225,938 | 7/1993 | Nomura | 359/699 |

FOREIGN PATENT DOCUMENTS

| 1110905 | 7/1961 | Germany . |
| 3922817 | 9/1990 | Germany . |
| 57-37306 | 3/1982 | Japan . |
| 64-11212 | 1/1989 | Japan . |
| 899635 | 6/1962 | United Kingdom . |
| 921951 | 3/1963 | United Kingdom . |
| 1104305 | 2/1968 | United Kingdom . |
| 1134777 | 11/1968 | United Kingdom . |
| 2084346 | 4/1982 | United Kingdom . |
| 2230354 | 10/1990 | United Kingdom . |

OTHER PUBLICATIONS

Feingeratetechink 38 (1989) 7, pp. 311–314.
English translation of German Office Action.

Primary Examiner—Georgia Y. Epps
Assistant Examiner—Thomas Robbins
Attorney, Agent, or Firm—Sandler, Greenblum & Bernstein

[57] ABSTRACT

A zoom lens barrel has at least front and rear lens groups and a linear movement guide device which guides the linear movement of the front and rear lens groups in an optical axis direction. The barrel includes a rotatable cam ring which has a first helicoid and at least one cam groove, a front lens barrel which supports the front lens group and which has a second helicoid which is engaged by the first helicoid of the cam ring. A rear lens frame which supports the rear lens group and which has at least one cam pin which can be fitted in the associated cam groove of the cam ring is provided.

40 Claims, 13 Drawing Sheets

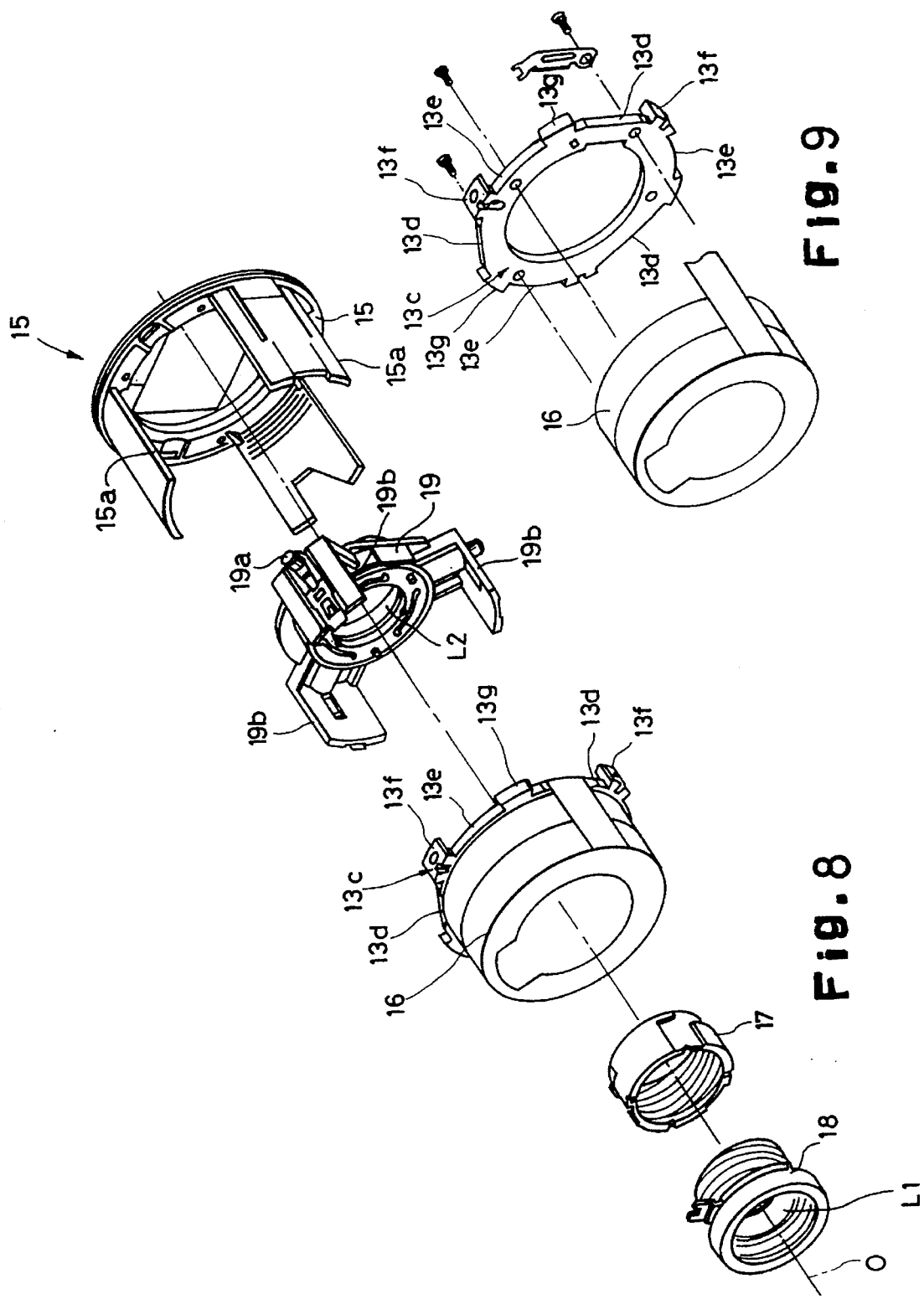

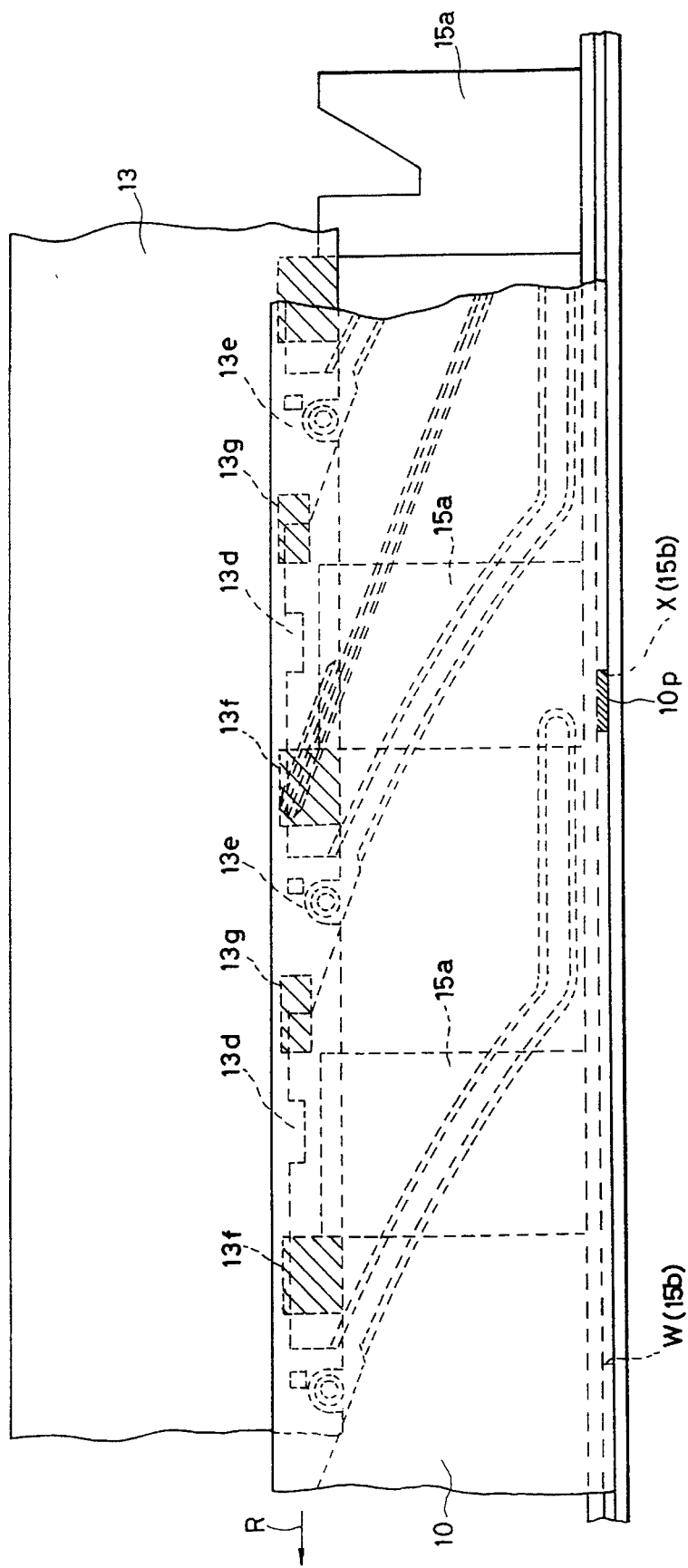

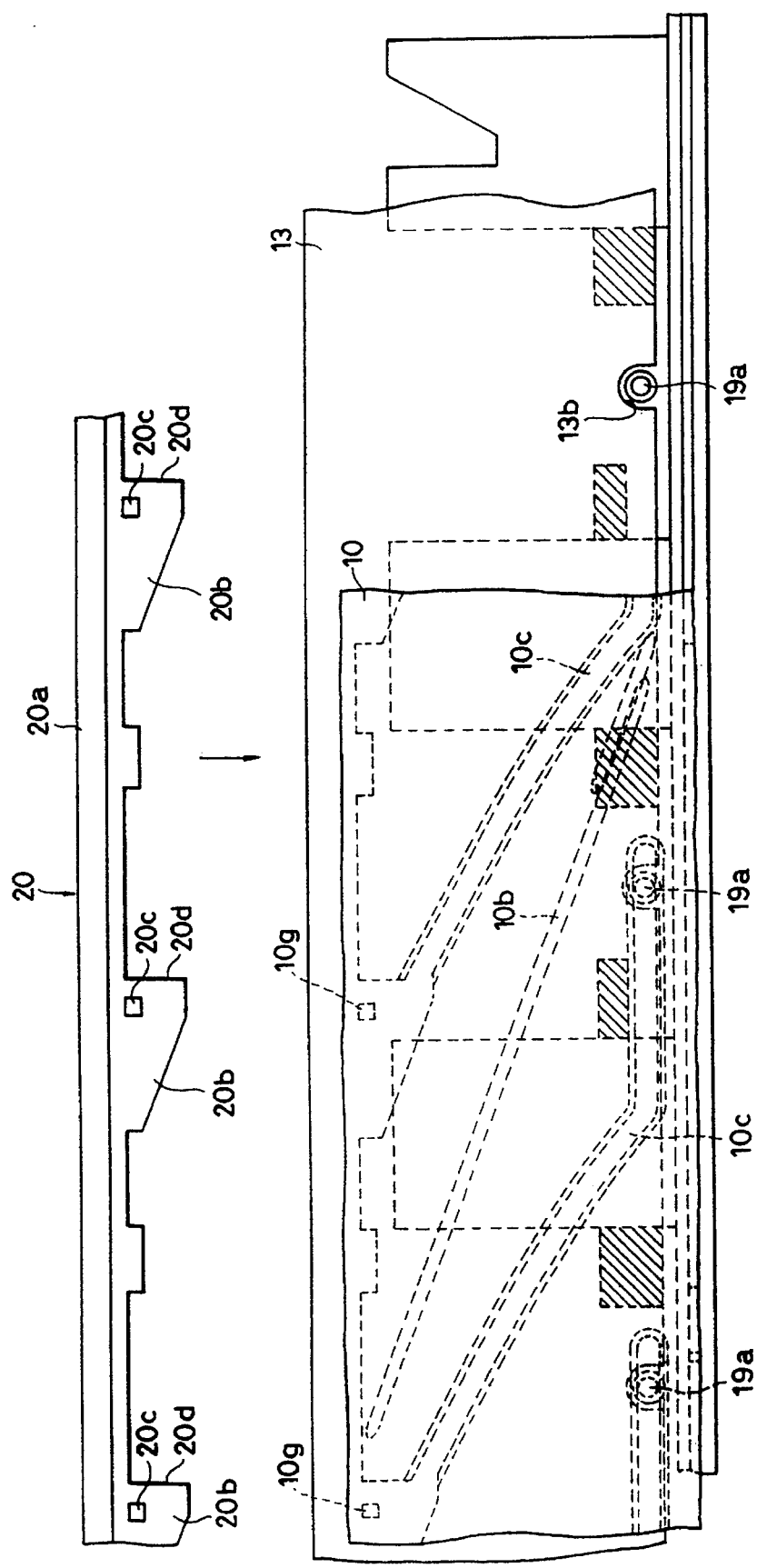

ZOOM LENS BARREL

This application is a division of application Ser. No. 08/074,723, filed Ju. 10, 1993, now abandoned, which is a continuation of application Ser. No. 07/602,176, filed Oct. 10, 1990, now abandoned.

BACKGROUND OF THE INVENTION

1. Field of the Invention

The present invention relates to a zoom lens barrel in a camera.

2. Description of the Related Art

A zoom lens usually has more than one group of lenses (front and rear groups of lenses) which are moved in the optical axis direction for the zooming operation.

A drive mechanism for the zoom lens usually includes a rotatable cam ring which is provided with cam grooves for the respective lens groups, and cam pins which are provided on the lens groups to be fitted in the associated cam grooves so that the cam pins move linearly. However, in such a conventional mechanism, since each of the lens groups is engaged by the cam ring through two or three cam pins at the most, the resistance to an external shock or impact which may be applied to the lens groups is insufficient. In particular, for instance, when a shock is applied to the first (frontmost) lens group which projects outwardly from the camera body due to an accidental drop of the camera, there is a possibility that the associated cam pins of the first lens group could be broken.

It is also known to provide a cam ring with bottomed inner cam grooves. In this known lens driving mechanism, there is a possibility that light might leak from the inner periphery of the cam ring. This requires a special, expensive light intercepting mechanism.

To solve the problems mentioned above, a zoom lens driving mechanism is also known in which only the first lens group which tends to be subject to an external shock or impact is moved by a helicoid rather than a combination of the cam pins and the cam grooves. However, in a zoom lens driving mechanism using the helicoid, since the lens group(s) other than the first lens group are (is) moved by a separate cam ring, the number of components of the lens driving mechanism increases, thus resulting in a heavier, more complicated and more expensive camera.

SUMMARY OF THE INVENTION

The primary object of the present invention is to provide a zoom lens driving mechanism in which the first lens group, which tends to be subject to external shocks or impacts, has high shock resistance, and in which there are fewer components.

Another object of the present invention is to provide a zoom lens driving mechanism which has an enhanced light intercepting effect.

One of the most significant features of the present invention resides in a single cam ring which has a threaded portion (lead screw) for driving the first lens group and cam grooves for driving the other lens group(s). This results in fewer components, high resistance to shock which is applied to the first lens group, and an enhanced light intercepting effect.

To achieve the objects mentioned above, according to the present invention, there is provided a zoom lens barrel having at least one front lens group and one rear lens group, comprising a rotatable cam ring which has a helicoid and at least one cam groove, a front support which supports the front lens group of lenses and which has a helicoid which is engaged by the helicoid of the cam ring, and a rear support which supports the rear lens group and which has at least one cam pin which is fitted in the cam groove of the cam ring.

The helicoid of the cam ring can be either a female helicoid formed on the inner surface of the cam ring or a male helicoid formed on the outer surface of the cam ring.

In case of a female helicoid, it is possible to provide the helicoid at a position different from the cam grooves in the optical axis direction of the cam ring, depending on factors such as distance between the front and second lens groups, etc. However, to reduce the length of the cam ring in the optical axis direction while ensuring a sufficient support length of the portion of the first lens group that is supported by the helicoid, and to realize a compact camera, it is preferable to first form predetermined profiles of continuous cam grooves on the cam ring, and then to discontinuously form a helicoid so that at least a part of the helicoid does not interfere with the cam grooves.

The cam grooves are preferably bottomed inner cam grooves which are formed in the inner periphery of the cam ring so as not to decrease the light intercepting effect of the helicoid.

BRIEF DESCRIPTION OF THE DRAWINGS

The invention will be described below in detail with reference to the accompanying drawings, in which:

FIG. 8 is an exploded view of the front lens frame, helicoid ring, lens shutter supporting frame, rear lens frame, and linear movement guide ring of a zoom lens barrel shown in FIG. 5;

FIG. 9 is an exploded view of the shutter unit and shutter supporting frame of a zoom lens barrel shown in FIG. 5;

FIGS. 11A, 11B, 11C, 11D and 11E are developed views showing how to assemble a zoom lens barrel shown in FIG. 5 in sequential steps;

DESCRIPTION OF THE PREFERRED EMBODIMENTS

Figure 1:
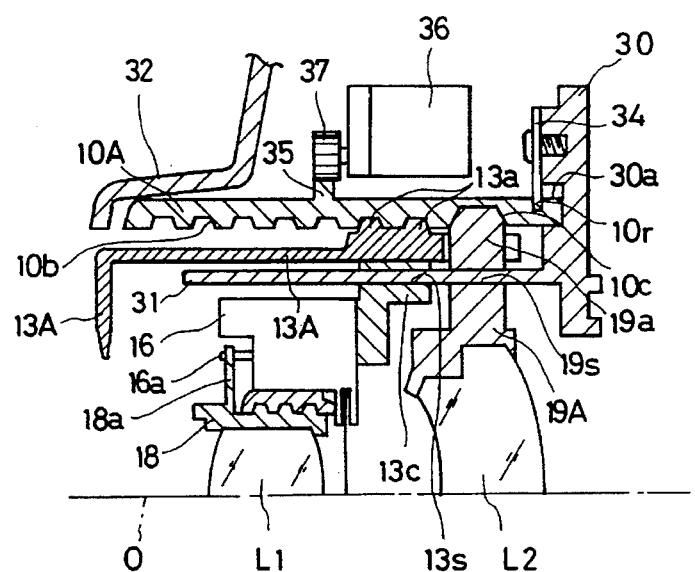
FIG. 1 is a longitudinal sectional view of an upper half of a zoom lens barrel, according to a first embodiment of the present invention.
Figure 2:
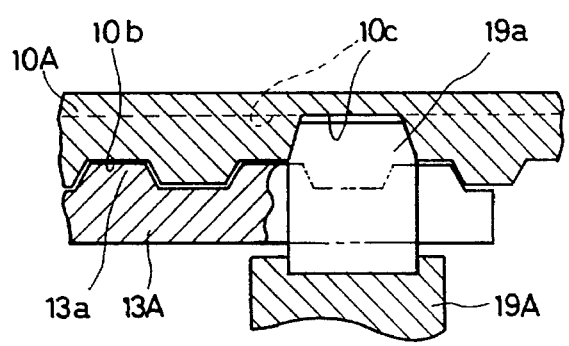
FIG. 2 is a sectional view of a cam ring having a female helicoid and an inner cam groove, a male helicoid of a front lens frame and a cam pin of a rear lens frame of a zoom lens barrel shown in FIG. 1.
Figure 3:
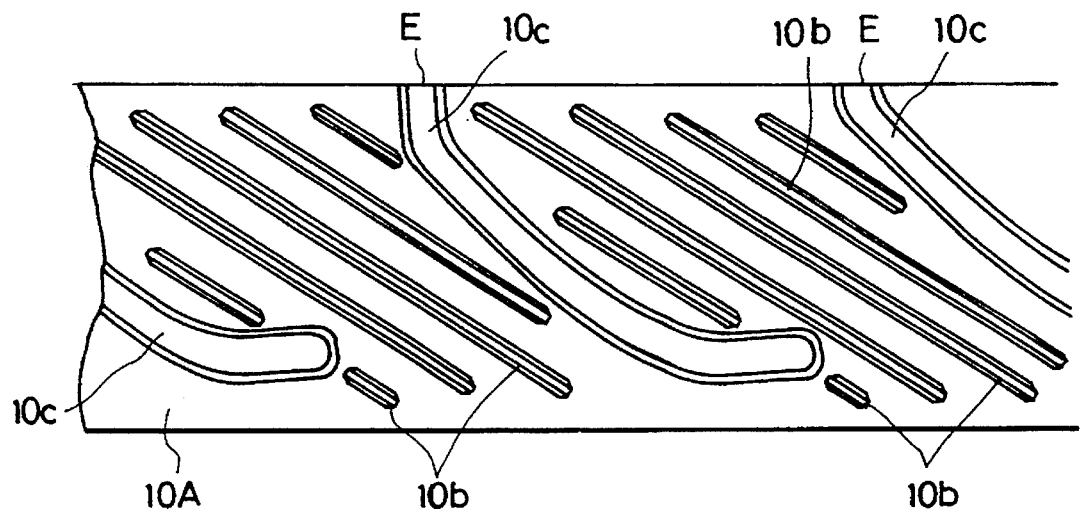
FIG. 3 is a developed view of a cam ring shown in FIG. 1.

FIGS. 1 through 3 show a zoom lens barrel driving mechanism which is applied to a lens shutter type of camera, according to the present invention.

In the illustrated embodiment, the zoom lens includes a front lens group L1 and a rear lens group L2. Each of the lens groups L1 and L2 consists of a plurality of lenses, which are, however, represented by one lens in the drawings.

The front lens group L1 is supported by a front lens support 18 which is engaged by a shutter unit 16 through a helicoid.

The front lens frame 18 has a driven pin 18a which is engaged by a drive pin 16a of the shutter unit 16. As is well known, the shutter unit 16 rotates the drive pin 16a by an angular displacement corresponding to a distance signal of an object (i.e. subject) to be taken (i.e. photographed), which is detected by an object distance measuring device (not shown). When the drive pin 16a is driven, rotation is transmitted to the front lens frame 18 (front lens group L1), so that the front lens group L1 moves in the optical axis direction while rotating to complete the focusing. The shutter unit 16 opens and closes shutter blades 16b in accordance with the brightness (luminance) signal of the object.

The shutter unit 16 which supports the front lens group L1 is secured to a shutter supporting frame 13c which is secured to a front lens barrel 13A having a male helicoid 13a. A rear stationary plate 30 secured to a camera body has a linear movement guide 31 integral therewith which extends forwardly in parallel with the optical axis O. The linear movement guide 31 is fitted in a linear movement guide hole 13s formed in the shutter supporting frame 13c and a linear movement guide hole 19s formed in a rear lens frame 19A which supports the rear lens group L2, so as to restrict the movement direction of the front lens group L1 and the rear lens group L2 in the optical axis direction O.

A cam ring 10A located in an outer lens barrel 32 which is integral with the camera body bears at its rear end face against the bottom of an annular groove 30a formed in the rear stationary plate 30. The cam ring 10A is provided on its rear outer periphery with an annular groove 10r in which a plate 34 which is secured to the rear stationary plate 30 by a screw is fitted to prevent the cam ring 10A from moving in the optical axis direction. Thus the cam ring 10A is rotatably supported by the rear stationary plate 30. The cam ring 10A is provided on its outer periphery with a gear 35 integral therewith, which is in mesh with a pinion 37 of a zoom motor 36.

The cam ring 10A is provided on its inner periphery with inner cam grooves 10c and a female helicoid 10b. The inner cam grooves 10c open to the end face (upper end face in FIG. 3) of the cam ring 10A at one end E thereof, as shown in FIG. 3. The female helicoid 10b of the cam ring 10A is engaged by a peripheral male helicoid 13a which is formed on a rear end of a front lens barrel 13A. In the inner cam grooves 10c are fitted cam pins 19a which are provided on the rear lens frame 19A through the open ends E of the cam grooves 10c.

The location of the female helicoid 10b partially overlaps the inner cam grooves 10c. This is because the helicoid 10b is discontinuously formed so as not to interfere with the cam grooves 10c. Namely, there is no helicoid tooth on the cam grooves. One of the most significant features of the present invention is the formation of the inner cam grooves 10c and the female helicoid 10b on the single cam ring 10A. Upon forming the inner cam grooves 10c and the female helicoid 10b in such a way that the locations thereof partially overlap each other, the inner cam grooves 10c have a priority. Namely, the continuous inner cam grooves 10c are first formed, and the helicoid 10b is discontinuously formed so as not to interfere with the cam grooves. The discontinuous female helicoid 10b does not cause any problem with the engagement with the male helicoid 13a.

The zoom lens barrel as constructed above operates as follows.

When the zoom motor 36 rotates, the pinion 37 and the gear 35 which is in mesh with the pinion 37 causes the cam ring 10A to rotate. As a result, the front lens barrel 13A which is guided to move in the optical axis direction by the linear movement guide 31, and accordingly, the front lens group L1 are both moved in the optical axis direction O by the engagement of the female helicoid 10b of the cam ring 10A with the male helicoid 13a.

On the other hand, when the cam ring 10A rotates, the rear lens frame 19A which is guided to move in the optical axis direction by the linear movement guide 31, and accordingly the rear lens group L2, are both moved in the optical axis direction O by the engagement of the cam pin 19a and the inner cam groove 10c.

The movement of the front lens group L1 with respect to the angular displacement of the cam ring 10A is linear in accordance with the helicoids 10b and 13a, whereas the movement of the rear lens group L2 is non-linear in accordance with the profile defined by the inner cam groove 10c. Consequently, the front lens group L1 and the rear lens group L2 move in the optical axis direction with a predetermined relationship while varying the spatial distance therebetween to perform the zooming.

If a shock or a strong external force is applied to the front lens barrel 13A which projects from the outer lens barrel 32, the front lens barrel 13A has a resistance large enough to bear the shock or the external force, since the front lens barrel 13A and the cam ring 10A engage with each other through the helicoids 10b and 13a having a substantially larger contact surface than that of the roller in the prior art. Furthermore, the helicoids 10b and 13a constitute a reliable light intercepting mechanism to intercept light which would otherwise enter the lens barrel.

Figure 4:
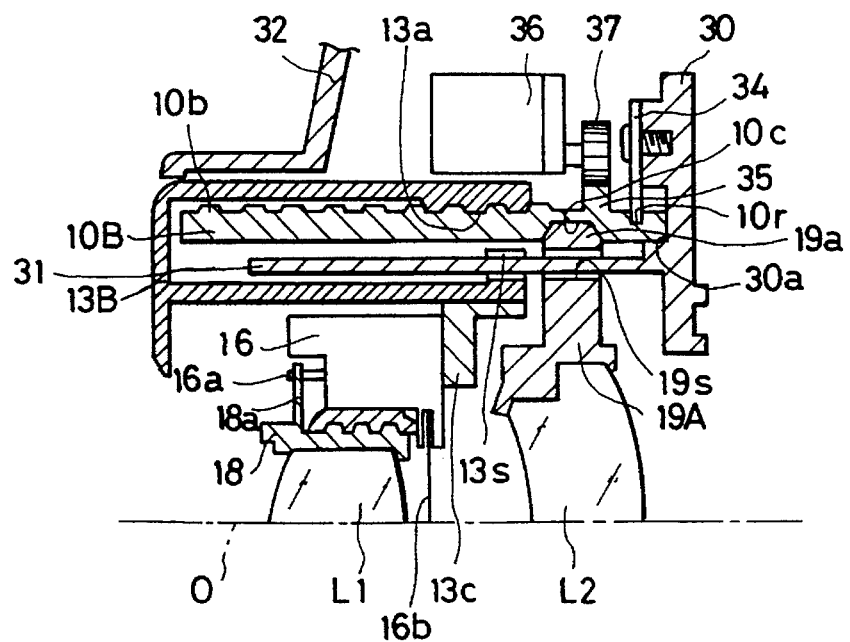
FIG. 4 is a longitudinal sectional view of an upper half of a zoom lens barrel, according to a second embodiment of the present invention.
Figure 6:
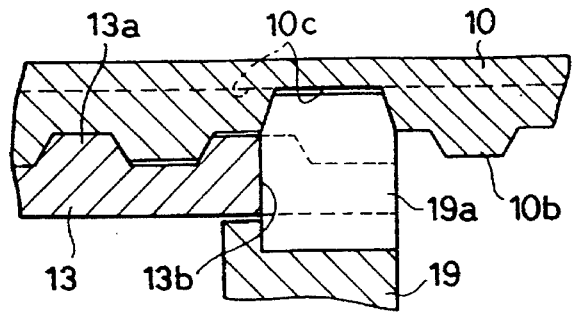
FIG. 6 is a sectional view of a cam ring having a female helicoid and an inner cam groove, a male helicoid of a front lens frame and a cam pin of a rear lens frame of a zoom lens barrel shown in FIG. 5.

In FIG. 4, which shows a modification of FIG. 1, the male helicoid 10b' is formed on the outer periphery of the cam ring 10B. The female helicoid 13a' is formed on the front lens barrel 13B which holds the shutter supporting frame 13c secured thereto, so that the male helicoid 10b' engages with the female helicoid 13a'. The front lens barrel 13B is of a double tubular construction, so that the female helicoid 13a' can be formed therein. The other components in FIG. 4 are the same as those in the first embodiment shown in FIG. 1, and accordingly are designated with the same reference numerals as those in FIG. 1.

In this modified embodiment, although the diameter of the lens barrel becomes slightly larger than that of the first embodiment due to the double tubular front lens barrel 13B, the same technical effect and operation as in the first embodiment can be obtained. Also, in this modified embodiment, since the male helicoid 10b' and inner cam groove 10c are formed on the outer periphery and the inner periphery of the cam ring 10B respectively, it is not necessary to make the male helicoid 10b' discontinuous.

The above mentioned embodiments are directed to a zoom lens having a cam ring 10A or 10B which rotates without moving in the optical axis direction. FIGS. 5–9 show another embodiment which is directed to a zoom lens having a cam ring 10 which moves in the optical axis direction while rotating.

In FIGS. 5–9, the stationary lens barrel 11 integral with the camera body has a helicoid ring 12 secured thereto which is provided with a female helicoid 12a which is engaged by a male helicoid 10a formed on the outer periphery of the cam ring 10. The cam ring 10 is provided on its inner periphery with a female helicoid 10b and inner cam grooves 10c. The male helicoid 13a of the front lens barrel 13 engages with the female helicoid 10b. The inner cam grooves 10c open at their front ends into the end face of the cam ring 10. The linear movement guide plate 14 is provided on the rear end of the cam ring 10 and has radially projecting projections 14a with axially bent ends which are fitted in the axially extending linear movement guide grooves 11a of the stationary lens barrel 11. A linear movement guide ring 15 is secured to the linear movement guide plate 14, so that the cam ring 10 is rotatable relative to the linear movement guide ring 15. The linear movement guide ring 15 which is restricted so as not to rotate is provided on its inner periphery with a plurality of linear keys 15a which extend in a direction parallel with the optical axis and which have open recesses at their front ends. In the illustrated embodiment, three linear keys 15a which are spaced from one another at an equiangular distance are provided to define an imaginary cylinder.

A shutter supporting frame (guide member) 13c to which a rear end of an annular shutter unit 16 is secured is secured to the front lens barrel 13. The helicoid ring 17 which is formed on the inner periphery of the shutter unit 16 is engaged by the front lens frame 18 which holds the front lens group. The shutter unit 16 itself is the same as that shown in FIGS. 1 and 4.

The annular shutter supporting frame 13c of the front lens barrel 13 is provided on its periphery with three linear grooves 13d (which will be referred to as front linear grooves) for the front lens group, spaced from one another at an equiangular distance, as shown in FIGS. 8 and 9. The linear keys 15a are slidably fitted in the corresponding linear grooves 13d, so that the shutter supporting frame 13c and accordingly the front lens barrel 13 are linearly moved in the optical axis direction. The shutter supporting frame 13c also has linear grooves 13e (which will be referred to as rear linear grooves) for the rear lens group, located between the adjacent front linear grooves 13d.

The rear lens frame 19 which supports the rear lens group L2 has radially projecting cam pins 19a which are fitted in the associated cam grooves 10c of the cam ring 10. The rear lens frame 19 has linear keys 19b which are fitted in the rear linear grooves 13e of the shutter supporting frame 13c. The linear keys 19b extend in a direction parallel with the optical axis and have open recesses at their front ends, similarly to the linear keys 15a of the linear movement guide ring 15. The linear keys 19b are spaced from one another at an equiangular distance to define an imaginary cylinder.

Upon assembly, the cam pins 19a of the rear lens frame 19 are fitted in corresponding recesses 13b formed on the rear end face of the front lens barrel 13. This makes it possible to insert the cam pins 19a into the inner cam grooves 10c from the front open ends thereof when the male helicoid 13a of the front lens barrel 13 is engaged by the female helicoid 10b of the cam ring 10. After the completion of assembly, when the cam ring 10 rotates, the front lens barrel 13 and the rear lens frame 19 are independently moved in the optical axis direction in accordance with the profiles of the helicoids 10b and 13a and the profile of the cam grooves 10c, respectively.

The zoom lens barrel as constructed above operates as follows.

When the cam ring 10 rotates, the cam ring 10 moves in the optical axis direction by the engagement of the male helicoid 10a and the female helicoid 12a. At the same time, the front lens barrel 13 (front lens group L1) is linearly moved in the optical axis direction by the engagement of the female helicoid 10b and the male helicoid 13a and the linear movement guide mechanism of the shutter supporting frame 13c and the linear movement guide ring 15. Furthermore, the rotation of the cam ring 10 causes the rear lens frame 19 (rear lens group L2) to move in the optical axis direction to carry out the zooming by the engagement of the cam pins 19a of the rear lens frame 19 and the cam grooves 10c of the cam ring 10, and the linear movement guide mechanism of the rear lens frame 19 and the linear movement guide ring 15.

If shock or strong external force is applied to the front lens barrel 13 which holds the front lens group L1, the front lens barrel 13 has a resistance large enough to bear the shock or the external force, since the front lens barrel 13 and the cam ring 10 engage with each other through the helicoids 13a and 10, which have a substantially larger contact surface than that of the roller in the prior art. Furthermore, the helicoids 10b and 13a constitute a reliable light intercepting mechanism to intercept light which would otherwise enter the lens barrel, similar to the embodiments shown in FIGS. 1 and 4.

Furthermore, according to the embodiment shown in FIGS. 5–9, adverse influence on a focal point due to an external force, for example an external pressure in the optical axis direction, applied to the front lens barrel 13 can be reduced. Namely, when axial pressure is applied to the front lens barrel 13, the latter tends to rotate, since the front lens barrel 13 engages with the cam ring. As a result of this tendency, a force which tends to circumferentially deform the linear keys 15a is applied to the linear keys 15a through the front linear grooves 13d. As a result, if elastic deformation of the linear keys 15a in the circumferential direction occurs, the axial position of the front lens barrel 13 which is guided by the helicoid 13a changes. On the other hand, even if the linear keys 15a elastically deform, the rear lens group L2 rotates similarly to the front lens group L1, thus resulting in the axial displacement of the rear lens group L2 in the same direction as that of the front lens group L1, since the linear keys 19b of the rear lens frame 19 are fitted in the rear linear grooves 13e of the shutter supporting frame 13c. Namely, only a very small change (negligible change) in distance between the front lens group L1 and the rear lens group L2 occurs due to the deformation of the linear keys 15a. Thus, an adverse influence on the focal point can be minimized. This advantage becomes more apparent if a comparison is made with a linear guide mechanism in which the rear lens group L2 is guided independently of the front lens group L1. Namely, in such a linear guide mechanism, since no movement of the rear lens group L2 takes place, there is a large change in distance between the front lens group L1 and the rear leans group L2.

As can be seen from the foregoing, according to the above mentioned embodiment of the present invention, since the rear lens group is linearly moved relative to the front lens group which is linearly moved toward the stationary lens barrel, even if the front lens group is rotated by an external force, the rotation can be transmitted to the rear lens group. Consequently, a possible change in spatial distance between the front and rear lens groups can be minimized, thus resulting in substantially minimal influence on the focal point.

The following discussion will be directed to the assembly of the zoom lens barrel according to the present invention, with reference to FIG. 10 and FIGS. 11A–11E.

The helicoid 10b of the cam ring 10 and the helicoid 13a of the front lens barrel 13 must be engaged with each other to have a specific angular relationship to provide a predetermined spatial distance between the front lens group L1 and the rear lens group L2. Generally speaking, the helicoids (multiple threads) can be engaged with each other at every 360° /N of angular distance, wherein N is the number of threads.

To make it possible to engage the helicoids at a specific angular position, according to the present invention, the helicoid 10b has an extended helicoid thread or extended helicoid threads 10b (l) which is or are formed by at least one of a plurality of threads or every two threads thereof at the most. The extension of the thread(s) is formed on the end face of the helicoid at the beginning portion of the engagement thereof. Furthermore, the helicoid 13a has a shortened helicoid thread or helicoid threads 13a(s) corresponding to the extended helicoid thread or threads 10b(l). The reduction of the helicoid threads is formed on the end face of the helicoid at the beginning portion of the engagement thereof. The extended helicoid threads 10b(l) are positioned in such a way that when a pair of helicoid bodies are axially and relatively moved at a predetermined specific angular position, the extended helicoid threads 10b(l) do not come into engagement with the shortened helicoid threads 13a(s) but come into engagement with the helicoid threads 13a adjacent thereto.

In the illustrated embodiment, three extended helicoid threads 10b (l) and three shortened helicoid threads 13a(s) are provided at an equiangular distance of 120° to correspond to the inner cam grooves 10c and the cam pins 19a.

Figure 11A:
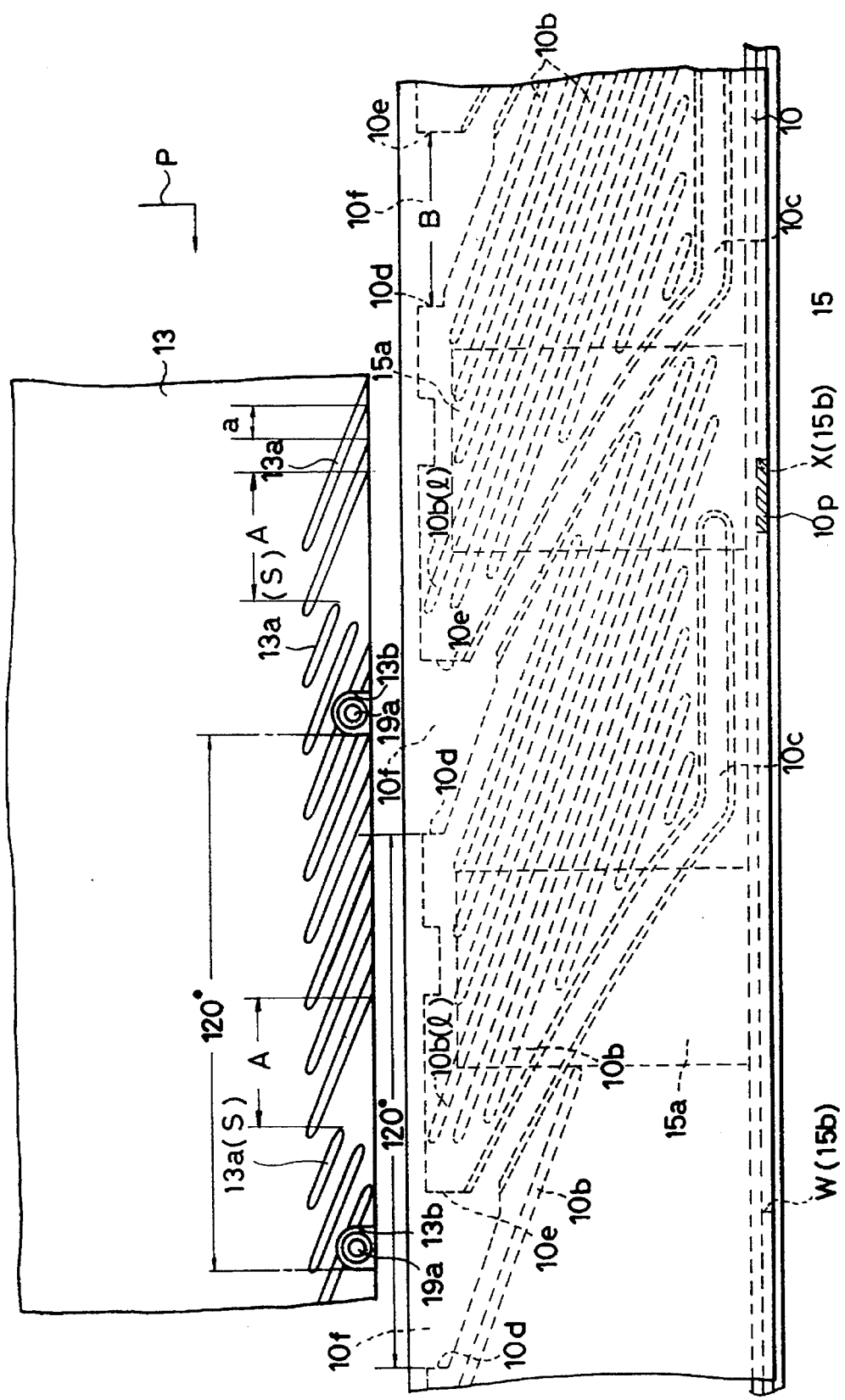

Thus when the front lens barrel 13 and the cam ring 10 are rotated relative to each other after the former is pressed against the cam ring 10 within an allowable limit of the length (angle) A, as shown in FIG. 11A, the front lens barrel 13 and the cam ring 10 are engaged with each other at a predetermined specific angular position. If there are no extended helicoid threads 10b (l) and no shortened helicoid 13a(s), the allowable limit for engaging the front lens barrel 13 with the cam ring 10 is not the length (angle) A but the length (angle) a, as shown in FIG. 11A.

Furthermore, in the present invention, to make it possible to more easily engage the front lens barrel 13 and the cam ring 10 at a specific angular position, the cam ring 10 is provided, on its inner peripheral end face adjacent to the beginning portion of the engagement with the front lens barrel 13, with stop members or stop surfaces 10d which come into contact with further stop members which are constituted by the cam pins 19a of the rear lens frame 19 integral with the front lens barrel 13 upon assembly. The stop surfaces 10d are formed by extension of one of the walls of the inner cam grooves 10c. The other walls 10e of the inner cam grooves 10c define cam pin insertion grooves 10f of length (angle) B between the walls and the stop surfaces 10d. The cam pins 19a and the stop surfaces 10d come into engagement with each other when the front lens barrel 13 which is slightly inserted in the cam ring 10 is relatively rotated in a direction opposite to the direction of engagement, so that the front lens barrel 13 and the cam ring 10 can be engaged at a specific angular position.

Figure 11B:
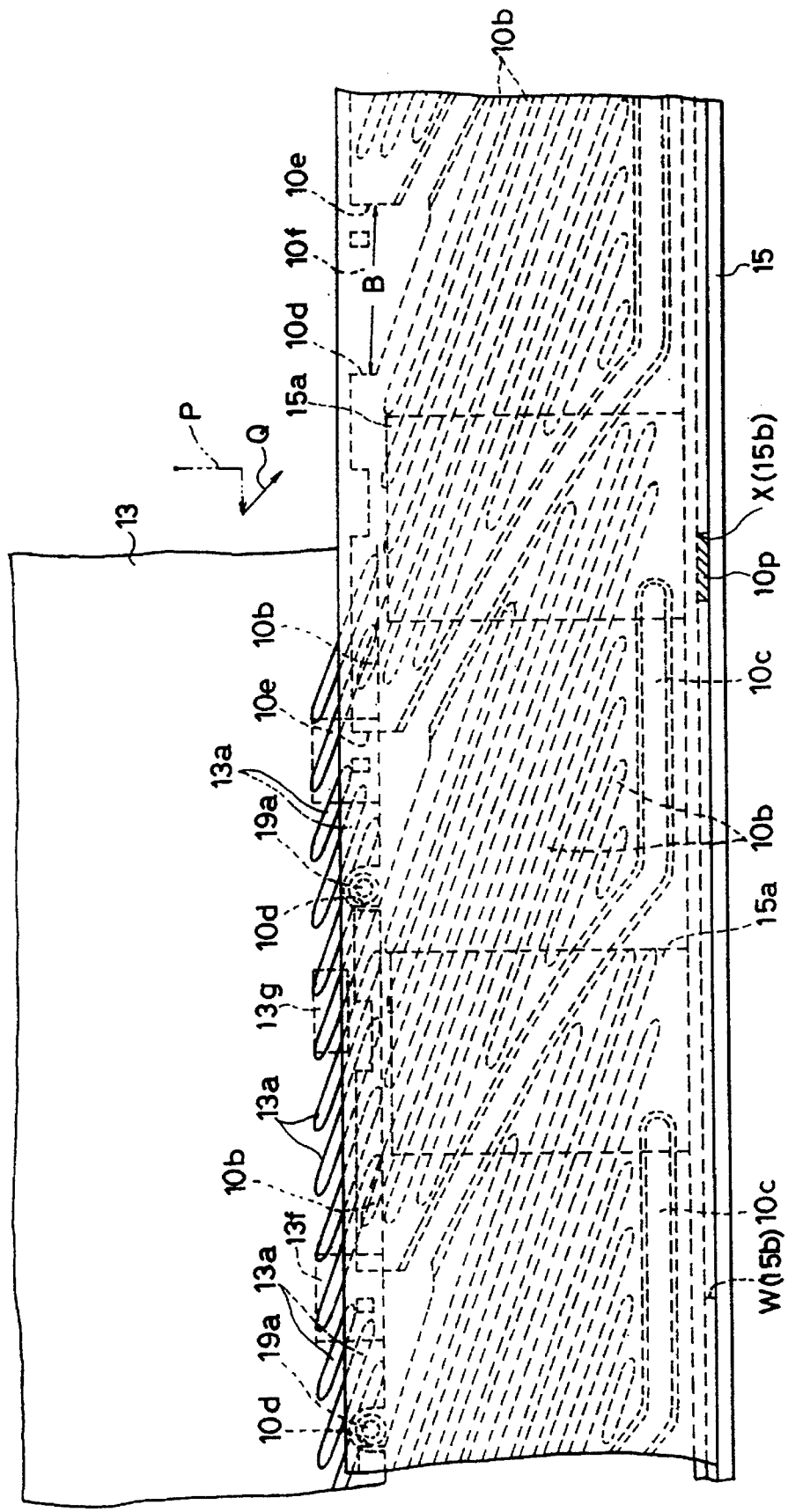

Namely, upon assembly, the cam pins 19a are located in the recesses 13b of the front lens barrel 13 to be integral therewith. When the front lens barrel 13 is rotated in a direction (arrow P in FIG. 11A) opposite to the direction of engagement after the cam pins 19a are inserted in the cam pin insertion grooves 10f of the cam ring 10, the cam pins 19a come into engagement with the stop surfaces 10d (FIG. 11B). This position of engagement corresponds to the specific angular position in which the front lens barrel 13 is to be engaged with the cam ring 10. The front lens barrel 13 is further rotated in the direction of an arrow Q in accordance with the helicoids 10c and 13a in FIG. 11B to complete the engagement.

In the illustrated embodiment, both the positioning using the stop surfaces 10d and the cam pins 19a and the positioning using the extended helicoid threads 10b(l) and the shortened helicoid threads 13a(s) are used. Since there are three cam pins 19a, three stop surfaces 10d, three extended helicoid thread 10b(l) and three shortened helicoid thread 13a(s) at equiangular distance of 120° to prevent the front lens barrel 13 and the cam ring 10 from inclining with respect to the optical axis O upon assembly, easier positioning can be realized. However, it is possible to use only one of the positioning mechanisms (positioning by the stop surfaces 10d and the cam pins 19a and positioning by the extended helicoid threads 10b and the shortened helicoid threads 13a).

The cam ring 10, the front lens barrel 13 and the linear movement guide ring 15 have the following interrelationship.

The angular displacement of the cam ring 10 is restricted by an angular displacement restricting projection 10p which is formed on the cam ring 10 to project inwardly in the radial direction and an annular groove 15b of the linear movement guide ring 15 which restricts the angular displacement of the projection 10p. FIGS. 11A–11C show an assembly in which the angular displacement restricting projection 10p bears against one end X of the annular groove 15b. In this state, the cam ring 10 is rotated toward the TELE (i.e., telephoto) side beyond the TELE extremity of a normal zooming range. The assembly of the linear movement guide ring 15, the front lens barrel 13, the cam ring 10 and the rear lens frame 19 is effected at the position mentioned above. Note that the other end W of the annular groove 15b restricts the angular displacement of the cam ring 10 beyond the WIDE (i.e., wide-angle) extremity at the retracted position thereof.

Figure 11D:
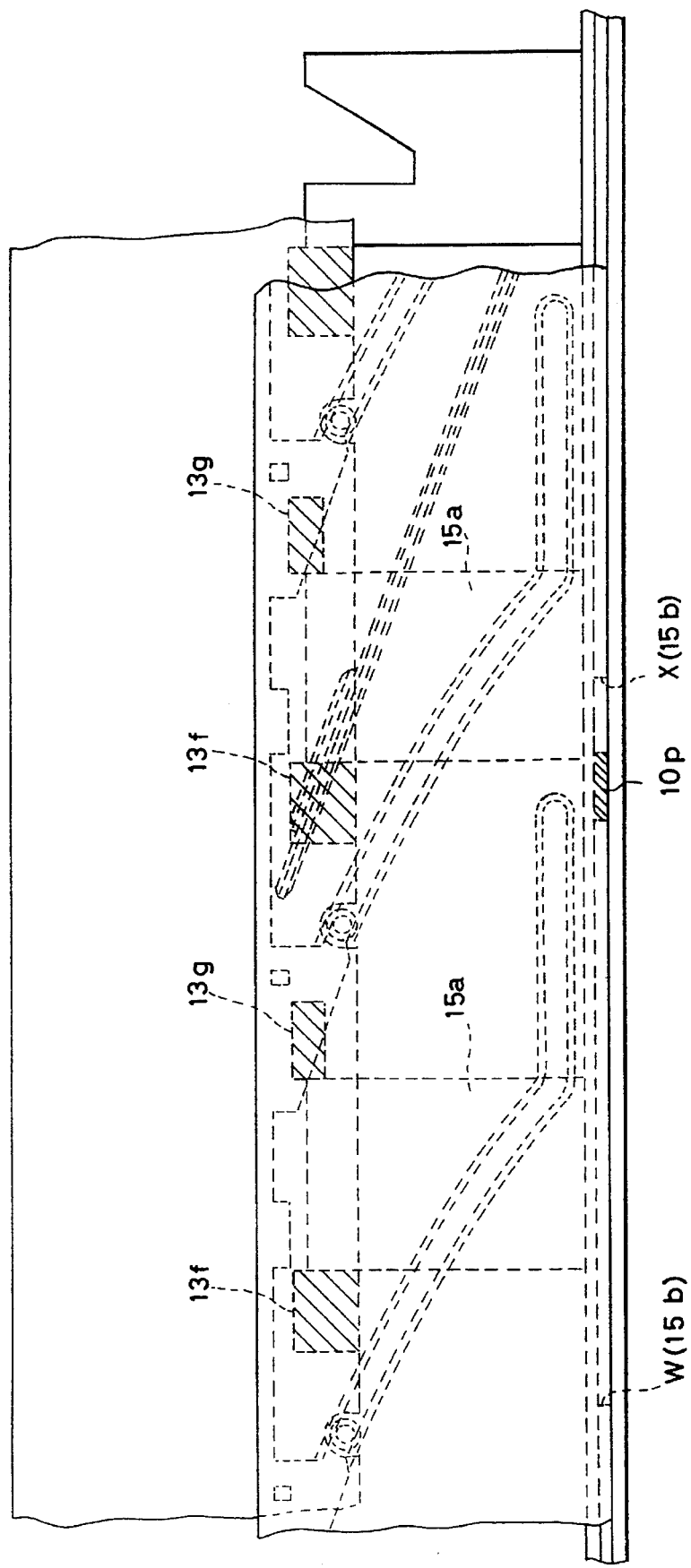

Each of the front linear grooves 13d of the shutter supporting frame 13c is defined by a pair of key projections 13f and 13g adjacent to each other (FIGS. 11B–11D and FIGS. 8 and 9). The key projections 13f and 13g have different radial lengths in the direction of the length of the linear keys 15a. This is because when the front lens barrel 13 is further rotated after the completion of the engagement of the helicoids shown in FIG. 11B, only the key projections 13f come into contact with one side of the linear keys 15a, as shown in FIG. 11C. The other key projections 13g come into contact with the other sides of the linear keys 15a when the cam ring 10 and the front lens barrel 13 are relatively rotated to advance the front lens barrel 13 by a predetermined displacement after the helicoid 10b of the cam ring 10 is engaged with the helicoid 13a of the front lens barrel 13 (FIG. 11D).

In this embodiment, thus the cam ring 10, the front lens barrel 13 and the linear movement guide ring 15 can be easily assembled.

In case where the rear lens group is also guided by another inner cam groove provided on the cam ring 10, the inner cam groove and the front inner cam grooves are provided on their entrance portions with portions parallel to the optical axis, so that the front lens barrel 13 can be inserted along the parallel portions in the optical axis direction. In this alternative, the radial length of the key projections 13f can be the same as that of the key projections 13g.

In the zoom lens barrel, according to the invention and as can be understood from the above discussion, the rear lens frame 19 can be simultaneously assembled. Namely, upon assembly, the cam pins 19a are inserted in enlarged grooves 10f of width (angle) B formed by the opposite extended wall portions 10d and 10e of the inner cam grooves 10c, as shown in FIGS. 11A and 11B. Thereafter, the front lens barrel 13 is rotated in the direction (arrow P in FIG. 11A) opposite to the direction of engagement until the cam pins 19a come into contact with the walls 10d. After that, when the front lens barrel 13 is rotated in the direction Q (direction of engagement), the key projections 13f of the shutter supporting frame 13c are brought into contact with one side of the linear keys 15a. A further rotation of the cam ring 10 in the direction R in accordance with the helicoids 10b and 13a causes the front lens barrel 13 to engage with the cam ring 10 through the helicoids, so that the cam pins 19a of the rear lens frame 19 are fitted in the inner cam grooves 10c. When the front lens barrel 13 is advanced by the rotation of the cam ring 10, the key projections 13g come into engagement with the linear keys 15a to complete the linear guide of the front lens barrel 13 in the optical axis direction (FIG. 11D). As mentioned above, when the cam ring 10 is rotated after the front lens barrel 13 is advanced by a predetermined displacement, the front lens barrel 13 and the rear lens frame 19 are independently moved in the optical axis direction in accordance with the helicoids 10b and 13a and the cam grooves 10c to carry out the zooming, respectively.

Figure 10:
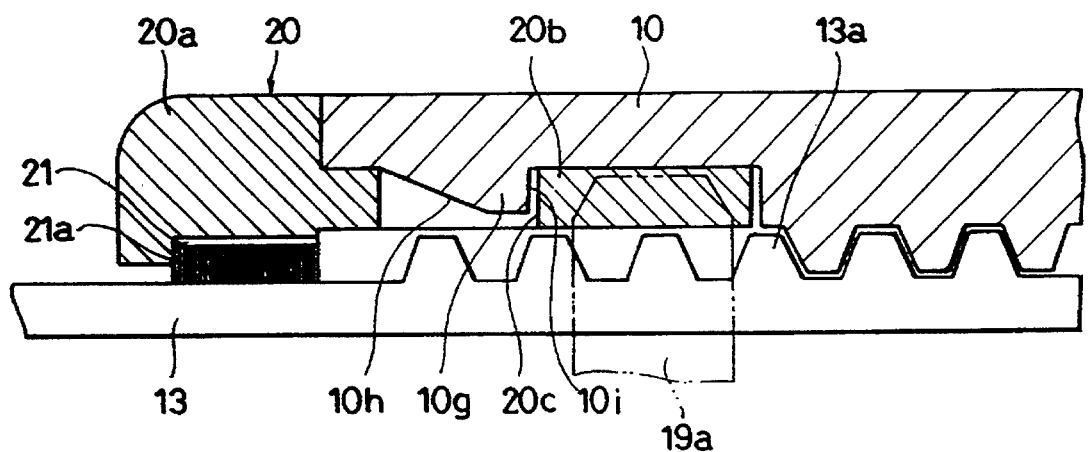
FIG. 10 is an enlarged sectional view of a front end portion of a cam ring of a zoom lens barrel shown in FIG. 5.

Upon the completion of assembly, a light intercepting ring 20 is inserted and engaged in the end face of the cam ring 10 in which the inner cam grooves 10c open. The light intercepting ring 20 which is made of, for example, synthetic resin has an annular body 20a which comes into close contact with the front end surface of the cam ring 10 and stop rib portions 20b which axially and inwardly extend from the annular body 20a, as shown in FIGS. 5, 7, 10 and 11E. The stop rib portions 20b have engaging holes 20c and stop surfaces 20d. The stop rib portions 20b are elastically deformable in the radial and inward direction. The annular body 20a of the light intercepting ring 20 is provided on its inner surface with a flock ring 21 having a flock 21a adhered thereto, as shown in FIG. 10. The flock 21a comes into contact with the front lens barrel 13 to prevent harmful light from entering through a gap between the front lens barrel 13 and the cam ring 10.

The cam ring 10 is provided on its inner surface with stop projections 10g which are fitted in the corresponding engaging holes 20c. The stop projections 10g have front oblique surface portions 10h and stop surfaces 10i connected thereto, so that when the stop rib portions 20b are inserted in the cam ring 10, the stop rib portions 20b are inwardly and elastically deformed by the oblique surface portions 10h. As a result, the stop projections are fitted in the corresponding engaging holes 20c due to the elasticity thereof, so that the stop surfaces 10i prevent the stop rib portions 20b from coming out of the cam ring 10. In this state, the stop surfaces 20d close the open ends of the inner cam grooves 10c to restrict one extremity (TELE extremity) of the displacement of the cam pins 19a.

Figure 5:
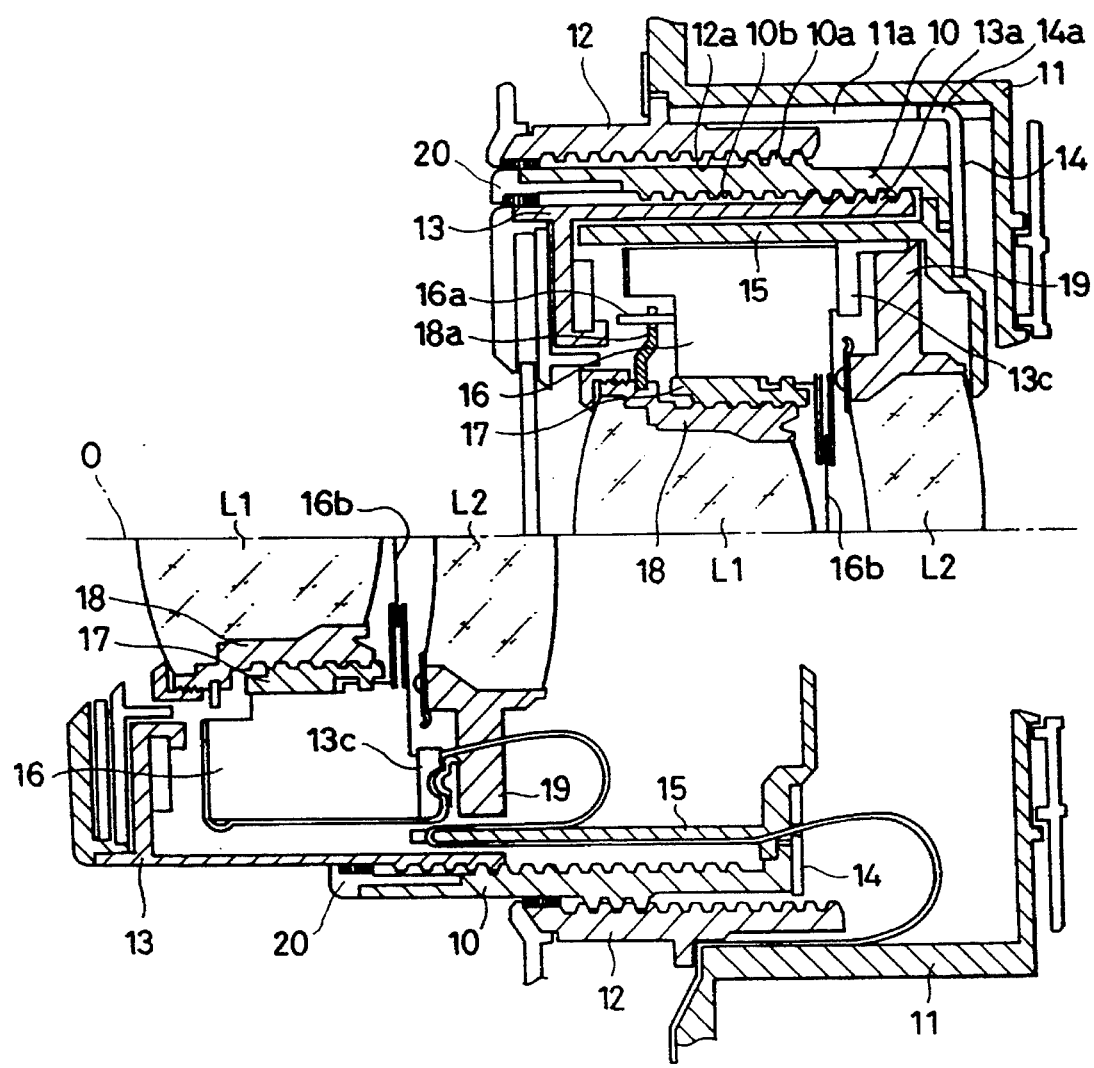
FIG. 5 is a longitudinal sectional view of a zoom lens barrel, of which an upper half shows a retracted (wide-angle) position and a lower half shows an extended telephoto, according to a third embodiment of the present invention.
Figure 7:
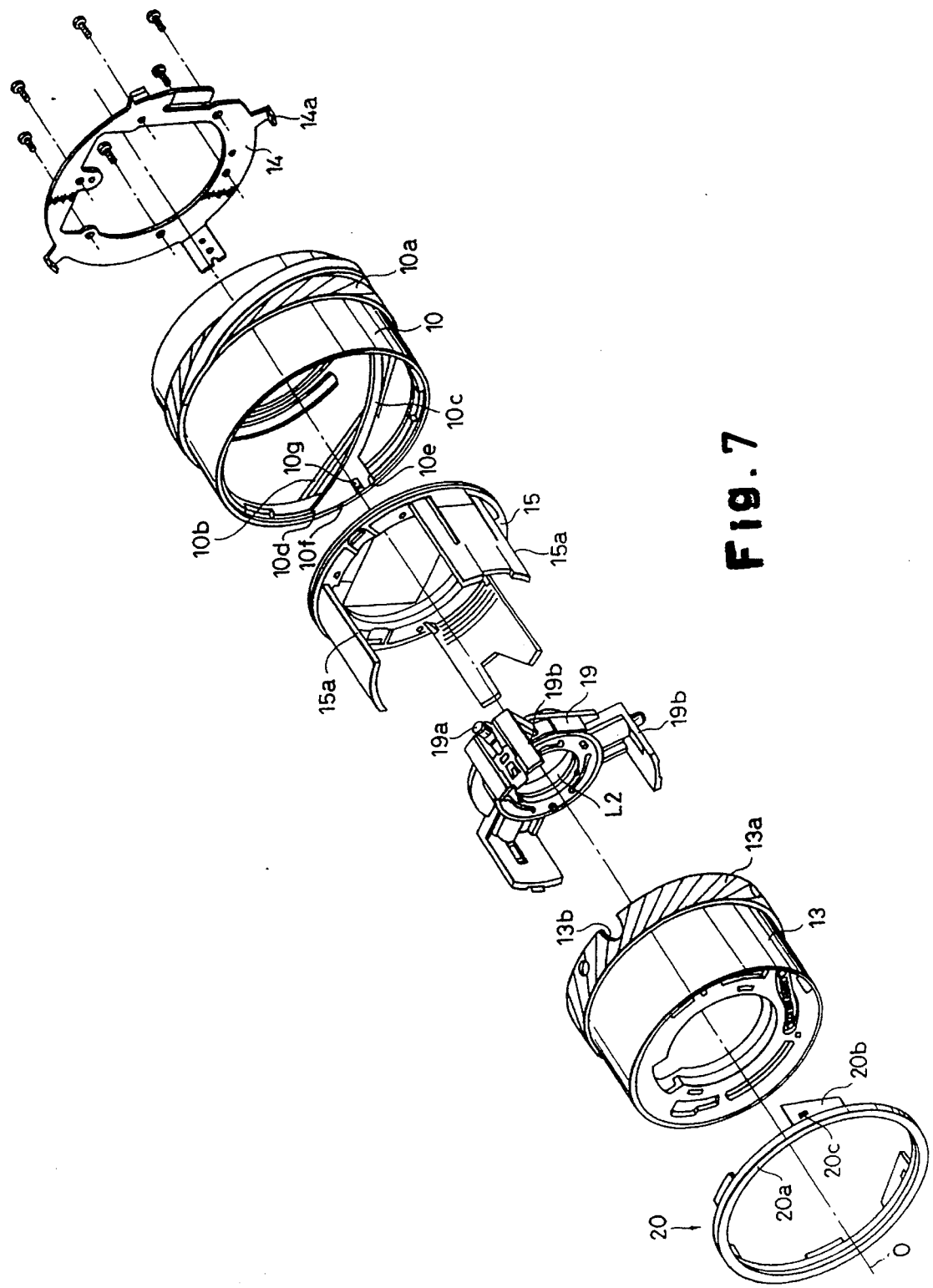
FIG. 7 is an exploded view of the light intercepting ring, front lens barrel, rear lens frame, linear movement guide ring, cam ring, and linear movement guide plate of a zoom lens barrel shown in FIG. 5.

The male helicoid 13a of the front lens barrel 13 is placed so that when the cam pins 19a come into contact with the stop surfaces 20d, the male helicoid 13a is located inside the stop rib portions 20b (FIGS. 5 and 10). The location of the male helicoid 13a as mentioned above contributes to preventing of a possible inward deformation of the stop rib portions 20b which may be caused when the cam pins 19a come into contact with the stop surfaces 20d, thus resulting in preventing of the light intercepting ring 20 from coming out of the cam ring 10.

As mentioned above, the cam pins 19a of the rear lens frame 19 can be mechanically prevented from coming out of the inner cam grooves 10c of the cam ring 10 by the insertion and engagement of the light intercepting ring 20 into the open end of the cam ring 10. Thus, a possible detachment of the cam ring 10 can be prevented.

Figure 12:
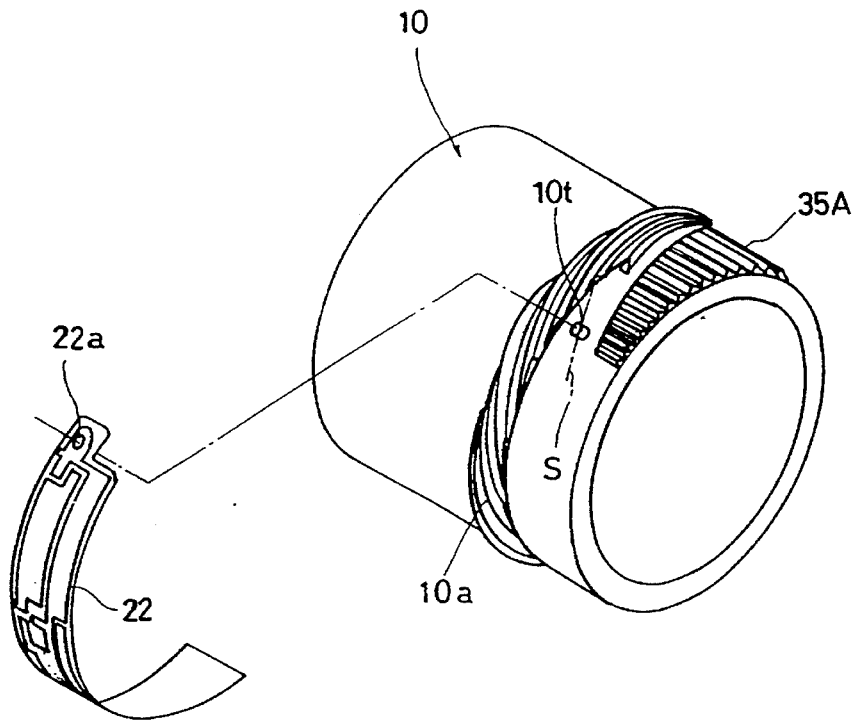
FIG. 12 is a perspective view of a positioning mechanism of a code plate relative to a cam ring.
Figure 13:
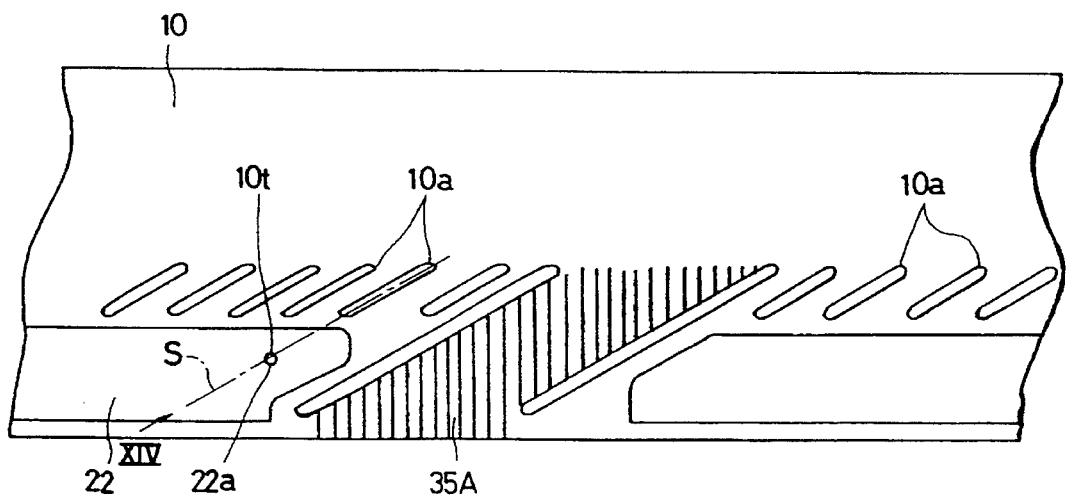
FIG. 13 is a developed view of a cam ring shown in FIG. 12.
Figure 14:
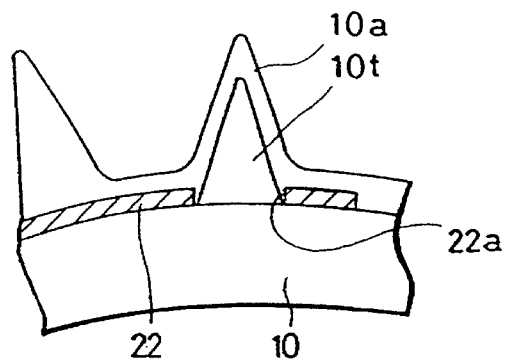
FIG. 14 is a view taken from a direction of an arrow XIV in FIG. 13.

FIGS. 12 to 14 show a positioning mechanism of a code plate 22 with respect to the cam ring 10. This mechanism is applied to a cam ring 10 which has a projection 10t for positioning the code plate 22. The improvement shown in FIGS. 12 to 14 is addressed to a reduction of thickness of the cam ring 10.

Namely, in the above mentioned zoom lens barrel, the code plate 22 is secured to the outer periphery of the cam ring 10, as shown in FIGS. 12 to 14. The code plate 22 comes into contact with a stationary brush (not shown) to detect the angular position of the cam ring 10 thereby, to detect the focal length in accordance with the angular position. The relative positions of the code plate 22 and the cam ring 10 must be exactly identical to each other. To this end, the code plate 22 has a positioning hole 22a and the cam ring 10 has the positioning projection 10t which is fitted in the positioning hole 22a. The code plate 22 is attached to the outer periphery of the cam ring 10 so as not to interfere with a driving gear 35A formed on the outer periphery of the cam ring 10.

The positioning projection 10t is located on an extension S of any one of the helicoid threads of the male helicoid 10a on the outer periphery of the cam ring 10 to be within and belong to the profile of that helicoid thread when viewed from the arrow XIV in FIG. 13 as shown in FIG. 14. This ensures the engagement of the male helicoid 10a and the female helicoid 12a during the rotation of the cam ring 10, since the positioning projection 10t enters the root of the mating male helicoid 10a, as shown in FIG. 14. Namely, it is not necessary to take the height of the projection 10t into account, in addition to the height the male helicoid 10a, and accordingly the thickness of the cam ring 10 can be reduced.

Figure 15:
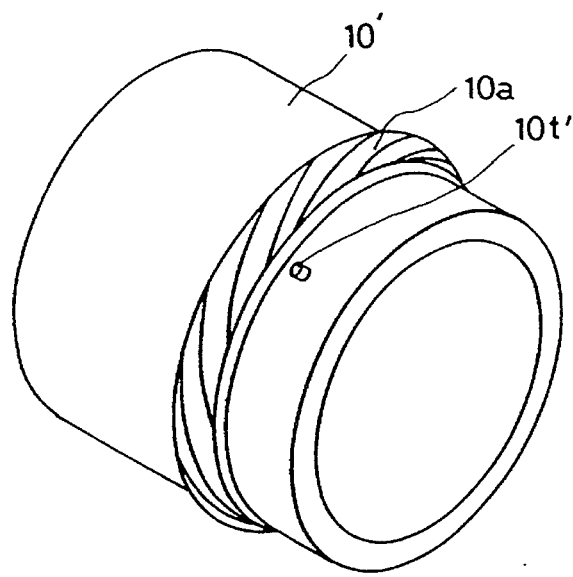
FIGS. 15 and 16 are a perspective view and a sectional view respectively of a known positioning mechanism of a code plate relative to a cam ring.
Figure 16:
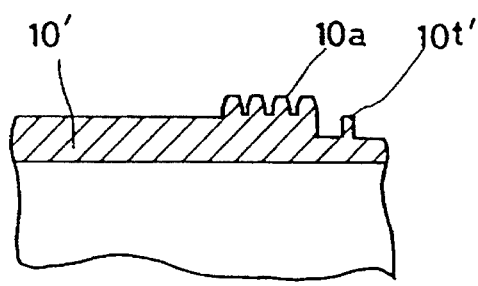

FIGS. 15 and 16 show a known cam ring 10' which has a positioning projection 10t' independently of the male helicoid 10a. It is necessary to provide the male helicoid 10a outside the positioning projection 10t' in order to ensure the engagement of the male helicoid 10a and female helicoid 12a. This results in an increase of thickness of the cam ring 10'. In other words, the thickness of the cam ring 10 can be reduced in spite of the provision of the positioning projection 10t in the present invention.

In the embodiment illustrated in FIGS. 12–14, the male helicoid 10a and the positioning projection 10t are provided on the outer periphery of the cam ring 10, but the present invention can be also applied to a cam ring 10 which is provided on its inner periphery with the helicoid and the positioning projection.

I claim:

1. A zoom lens barrel having at least front and rear lens groups and a linear movement guide means for linearly guiding said front and rear lens groups in an optical axis direction, comprising:

a rotatable cam ring which comprises a first helicoid and at leant one cam groove, wherein said first helicoid has a plurality of spaced threads, and wherein said at least one cam groove is positioned among said threads, said at least one cam groove extending across at least one of said threads and an area adjacent to said at least one thread;

a front lens barrel which supports said front lens group and which has a second helicoid which is engaged by said first helicoid of said cam ring; and a rear lens frame which supports said rear lens group and which has at least one cam pin which can be fitted in said cam groove of said cam ring.

2. A zoom lens barrel, according to claim 1, wherein said first helicoid of said cam ring is in the form of a female helicoid formed on an inner periphery of said cam ring and wherein said second helicoid of said front lens barrel is in the form of a male helicoid which is engaged by said female helicoid.

3. A zoom lens barrel according to claim 1, wherein said first helicoid of said cam ring is in the form of a male helicoid formed on an outer periphery of said cam ring and wherein said second helicoid of said front lens barrel is in the form of a female helicoid which is engaged by said male helicoid.

4. A zoom lens barrel according to claim 1, wherein said cam groove is in the form of a bottomed inner cam groove.

5. A zoom lens barrel in accordance with claim 1, wherein said at least one cam groove is not parallel to said threads.

6. A zoom lens barrel in accordance with claim 1, said at least one cam groove comprising a non-linear groove.

7. A zoom lens barrel having at least front and rear lens groups and a linear movement guide means for linearly guiding said front and rear lens groups in an optical axis direction, comprising:

a rotatable cam ring which comprises a first helicoid and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, wherein said first helicoid of said cam ring comprises a female helicoid formed on an inner periphery of said cam ring and wherein said second helicoid of said front lens barrel comprises a male helicoid which is engaged by said female helicoid, wherein said cam ring is provided with at least one continuous cam groove of a predetermined shape and wherein said female helicoid of said cam ring is partially discontinuous so as not to interfere with said at least one continuous cam groove.

8. A zoom lens barrel having at least front and rear lens groups and a linear movement guide means for linearly guiding said front and rear lens groups in an optical axis direction, comprising:

a rotatable cam ring which comprises a first helicoid and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, further comprising a stationary lens barrel which said cam ring engages through an additional helicoid.

9. A zoom lens barrel according to claim 8, wherein said linear movement guide means comprises a first linear movement guide mechanism of said front lens group, provided between said front lens barrel supporting said front lens group and said stationary lens barrel or a linearly moveable member guided by said stationary lens barrel, and a second linear movement guide mechanism of said rear lens group, provided between said rear lens frame supporting said rear lens group and said front lens barrel.

10. A zoom lens barrel according to claim 9, wherein said first linear movement guide mechanism of said front lens group comprises a linear movement guide ring which is restricted so as not to rotate and which has at least one linear key extending in parallel with the optical axis, and at least one linear groove in which said linear key is fitted and which is formed on a guide member integral with said front lens barrel.

11. A zoom lens barrel according to claim 10, wherein said second linear movement guide mechanism of said rear lens group comprises at least one linear groove formed in said guide member, and at least one linear key which is provided on said rear lens frame to be fitted in said linear groove and which extends in parallel with the optical axis.

12. A zoom lens barrel according to claim 11, wherein said guide member is comprises a shutter supporting frame secured to said front lens barrel to support a shutter unit.

13. A zoom lens barrel according to claim 9, wherein said first linear movement guide mechanism of said front lens group is provided with at least one linear key extending in parallel with said optical axis direction, said front lens barrel being provided with at least one linear groove in which said linear key can be fitted from the front end of said front lens barrel so that when said helicoids of said cam ring and said front lens barrel are engaged with each other, said linear key is simultaneously fitted in said linear groove.

14. A zoom lens barrel according to claim 13, wherein said cam ring can rotate the zoom lens barrel beyond an extremity end of a normal zooming section, so that said linear key and said linear groove can be engaged with each other at an angular position of said cam ring upon assembly.

15. A zoom lens barrel according to claim 14, wherein only one of a pair of walls defining said linear groove bears against said linear key at said angular position of said cam ring upon assembly, and wherein both said walls defining said linear groove come into engagement with said linear key when said cam ring is rotated toward a normal zooming section.

16. A zoom lens barrel having at least front and rear lens groups and a linear movement guide means for linearly guiding said front and rear lens groups in an optical axis direction, comprising:

a rotatable cam ring which comprises a first helicoid having a plurality of threads and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, wherein said cam ring is provided on one of its outer and inner peripheries with said first helicoid and at least one projection which is located at a different position from said first helicoid in the optical axis direction, wherein said projection is further located on an extension of one of said plurality of the threads of said first helicoid.

17. A zoom lens barrel according to claim 16, wherein said at least one projection has a shape which can be contained within a profile of said extension of one of said plurality of threads of said first helicoid.

18. A zoom lens barrel according to claim 16, further comprising a code plate adapted to be attached to the outer periphery of said cam ring, so that said projection can be adapted to position said code plate.

19. A zoom lens barrel having at least front and rear lens groups and a linear movement guide means for linearly guiding said front and rear lens groups in an optical axis direction, comprising:

a rotatable cam ring which comprises a first helicoid and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, wherein said first helicoid is a female helicoid, and said one cam groove is an inner cam groove having an open end, said second helicoid of said first front lens barrel comprises a male helicoid which is engaged by said female helicoid of said cam ring, said barrel further comprising an annular member adapted to be inserted and engaged in said open end of said inner cam groove of said cam ring, and at least one stop surface formed on said annular member to close said open end of said inner cam groove and restrict one of the extremities of the movement of said cam pin in opposite directions.

20. A zoom lens barrel according to claim 19, wherein said annular member comprises at least one stop rib portion adapted to be fitted in said cam ring, said stop rib portion provided with said stop surface and an engaging hole, said cam ring provided on its inner periphery with a stop projection adapted to be fitted in said engaging hole, said male helicoid of said front lens barrel positioned so that when said cam pin bears against said stop surface, said male helicoid is located inside said stop rib portion of said annular member.

21. A zoom lens barrel having at least front and rear lens groups and a linear movement guide means for linearly guiding said front and rear lens groups in an optical axis direction, comprising:

a rotatable cam ring which comprises a first helicoid and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, wherein said first and second helicoids comprise a plurality of helicoid threads and at least one of said helicoid threads of one of said first and second helicoids of said cam ring and said front lens barrel is extended toward a beginning portion of the engagement of said first and second helicoids, the helicoid thread corresponding to said extended helicoid thread of the other said helicoid is shortened from the beginning portion of the engagement of said first and second helicoids, so that when said cam ring and said front lens barrel are relatively moved in the optical axis direction at a specific angular position, said extended helicoid thread does not come into contact with said shortened helicoid thread, but comes into contact with said helicoid thread adjacent to said shortened thread.

22. A zoom lens barrel according to claim 21, wherein three extended helicoid threads are provided at equiangular distances on each of the cam ring and the front lens barrel.

23. A zoom lens barrel having at least front and rear lens groups and a linear movement guide means for linearly guiding said front and rear lens groups in an optical axis direction, comprising:

a rotatable cam ring which comprises a first helicoid and at least one cam groove;

a front lens barrel which supports said front lens group and which has a second helicoid which is engaged by said first helicoid of said cam ring;

a rear lens frame which supports said rear lens group and which has at least one cam pin which can be fitted in said cam groove of said cam ring, the zoom barrel comprising stop members on said first and second helicoids of said cam ring and said front lens barrel at the beginning of the engagement with each other when said helicoids are relatively rotated in the direction of disengagement, said stop members positioned so that said cam ring and said front lens barrel can be engaged with each other at a specific angular position.

24. A zoom lens barrel according to claim 23, wherein said stop member of said front lens barrel is in the form of a cam pin provided on said rear lens frame which is made integral with said front lens barrel in the optical axis direction upon assembly and wherein said stop member of said cam ring is in the form of a wall which defines said at least one cam groove.

25. A zoom lens barrel having an annular member which is provided on its peripheral surface with a helicoid and a projection which is located at a different axial position than said helicoid, wherein said projection is further located on an extension of thread of said helicoid.

26. A zoom lens barrel according to claim 25, wherein said annular member comprises a cam ring which rotates to move a lens group, and wherein said projection is adapted to position a code plate which can be attached to an outer periphery of said cam ring.

27. A zoom lens barrel having at least front and rear movable lens groups which can be moved in the optical axis direction, comprising:

a first linear movement guide mechanism for the front lens group, said first linear movement guide mechanism comprising a front lens barrel supporting said front lens group, and a stationary lens barrel or a linearly movable member, said front lens barrel being guided so as to be linearly moved with respect to said stationary lens barrel, and a second linear movement guide mechanism for said rear lens group, said second linear movement guide mechanism comprising a rear lens frame supporting said rear lens group and said front lens barrel, wherein at least one of said guide mechanisms includes a plurality of radially spaced guide members extending from an annular member towards said front lens group.

28. A zoom lens barrel according to claim 27, wherein said first linear movement guide mechanism of said front lens group comprises a linear movement guide ring which is restricted so as not to rotate and which has at least one linear key extending in parallel with the optical axis, and at least one linear groove in which said linear key is fitted and which is formed on a guide member integral with said front lens barrel.

29. A zoom lens barrel according to claim 28, wherein said second linear movement guide mechanism of said rear lens group comprises at least one linear groove formed in guide member, and at least one linear key provided on said rear lens frame to be fitted in said linear groove and which extends in parallel with the optical axis.

30. A zoom lens barrel according to claim 29, wherein said guide member comprises of a shutter supporting frame which supports a shutter unit.

31. A zoom lens barrel in accordance with claim 27, wherein said front lens barrel and said stationary lens barrel or said linearly movable member are in slidable contact with each other, and wherein said rear lens frame and said front lens barrel are in slidable contact with each other, said radially spaced members being in slidable contact with said front lens barrel.

32. A zoom lens barrel having a pair of helicoid bodies having helicoids which are engaged with each other at a specific angular position, wherein at least one helicoid thread of one of said helicoids of said helicoid bodies is extended toward a beginning portion of the engagement of said helicoids, the helicoid thread corresponding to the extended helicoid thread of the other helicoid is shortened from the beginning portion of the engagement of the helicoids so that when said helicoid bodies are relatively moved in an optical axis direction of the zoom barrel at a specific angular position, said extended helicoid thread does not come into contact with the shortened helicoid but comes into contact with the helicoid thread adjacent to said shortened helicoid.

33. A zoom lens barrel according to claim 32, wherein there are three extended helicoid threads are provided on each of the helicoid bodies at an equiangular distance from each other.

34. A zoom lens barrel having a pair of helicoid bodies having helicoids which are engaged with each other at a specific angular position, comprising:

stop members on said helicoid bodies at the beginning of the engagement engage with each other when said helicoid bodies are relatively rotated in the direction of disengagement, said stop members being positioned so that said helicoid bodies can be engaged with each other at a specific angular position.

35. A zoom lens barrel comprising:

a cam ring having an inner cam groove with an open end and a female helicoid;

a front lens barrel which supports a front lens group and which has a male helicoid which can be engaged by said female helicoid of said cam ring;

a rear lens frame which holds a rear lens group and which has a cam pin which can be fitted in said inner cam groove of said cam ring;

an annular member adapted to be inserted and engaged in said open end of said inner cam groove of said cam ring; and, a stop surface formed on said annular member to close said open end of said inner cam groove and to restrict an extremity of movement of said cam pin.

36. A zoom lens barrel according to claims 35, wherein said annular member comprises at least one stop rib portion adapted to be fitted in said cam ring, said stop rib portion provided with said stop surface and an engaging hole, said cam ring provided on its inner periphery with a stop projection adapted to be fitted in said engaging hole, said male helicoid of said front lens barrel positioned so that when said cam pin bears against said stop surface, said male helicoid is located inside said stop rib portion of said annular member.

37. A zoom lens barrel comprising:

a rotatable cam ring which has a helicoid or at least one cam groove;

a movable lens frame which has at least one cam pin or a helicoid which can be engaged with said cam groove or said helicoid of said cam ring; and, a linear movement guide member which guides linear movement of said movable lens frame;

said linear movement guide member provided with at least one linear key which extends in parallel with an optical axis;

said moveable lens frame provided with at least one linear groove in which said linear key can be inserted from the front end thereof;

said linear key and said linear groove being engaged with each other at the same time when said helicoid or said cam pin of said moveable lens frame is engaged by said helicoid or said cam groove of said cam ring.

38. A zoom lens barrel according to claim 37, wherein said cam ring can rotate upon assembly of the zoom lens barrel beyond an extremity end of a normal zooming section, so that said linear key and said linear groove can be engaged with each other at an angular position of said cam ring upon assembly.

39. A zoom lens barrel according to claim 38, wherein said cam ring and said moveable lens frame have helicoids engageable with each other, and wherein only one of a pair of walls defining said linear groove bears against said linear key at said angular position of said cam ring upon assembly, and wherein both said walls defining said linear groove come into engagement with said linear key when said cam ring is rotated toward a normal zooming section.

40. A zoom lens barrel comprising:

at least one front lens group secured to a front lens barrel and a rear lens group secured to a rear lens frame, said front and rear lens groups movable relative to one another along an optical axis of a zoom lens for adjusting a focus of the zoom lens;

linear movement guide means for preventing said front and rear lens groups from rotating when moving along the optical axis;

a control ring rotatable about the optical axis and having first and second control grooves at an inner surface facing said front and rear lens groups;

a projection provided on said front lens barrel and engaging said first control groove of said control ring and a control pin provided on said rear lens carrier and engaging said second control groove of said control ring;

said first control groove of said control ring comprising a helical groove, said projection provided on said front lens barrel comprising a helicoidal projection: and said helical groove and said second control groove of said control ring extend in a common area of said inner surface of said control ring, said helical groove being interrupted to accommodate said second control groove in said common area.

* * * * *

UNITED STATES PATENT AND TRADEMARK OFFICE
CERTIFICATE OF CORRECTION

PATENT NO. : 5,469,300  
DATED : November 21, 1995  
INVENTOR(S) : Hiroshi NOMURA Page 1 of 2

It is certified that error appears in the above-indentified patent and that said Letters Patent is hereby corrected as shown below:

On the Title page, in section [56], "References Cited", "U.S. PATENT DOCUMENTS", line 2, change "Usesugi" to ---Uesugi---;

in section [56], "References Cited", "U.S. PATENT DOCUMENTS", line 3, change "Shigoky" to ---Shigoku---;

in section [56], "References Cited", "FOREIGN PATENT DOCUMENTS", insert ---62-127513   8/1987  Japan---.

At column 11, line 1 (claim 1, line 6), change "leant" to ---least---.

At column 11, line 35 (claim 3, line 3), change "an" to ---the---.

At column 12, line 38 (claim 12, line 2), delete "is".

At column 15, line 11 (claim 29, line 4), before "guide" insert ---said---.

At column 15, line 14 (claim 30, line 2), delete "of".

At column 15, line 37 (claim 33, line 2), delete "there are".

At column 15, line 38 (claim 33, line 3), change "the" to ---said---.

At column 16, line 14 (claim 37, line 7), before "linear" insert ---the---.

UNITED STATES PATENT AND TRADEMARK OFFICE
CERTIFICATE OF CORRECTION

PATENT NO. : 5,469,300
DATED : November 21, 1995
INVENTOR(S) : Hiroshi NOMURA

It is certified that error appears in the above-indentified patent and that said Letters Patent is hereby corrected as shown below:

At column 16, line 17 (claim 37, line 10), change "an" to ---the---.
At column 16, line 27 (claim 38, line 2), delete "upon assembly of".

Signed and Sealed this

Twenty-ninth Day of October 1996

Attest:

BRUCE LEHMAN

Attesting Officer

Commissioner of Patents and Trademarks